(12) United States Patent
Gauker et al.

(10) Patent No.: US 9,565,838 B2
(45) Date of Patent: *Feb. 14, 2017

(54) TOP-FILL HUMMINGBIRD FEEDER WITH FLOAT VALVE BASE CLOSURE MECHANISM

(71) Applicant: WOODSTREAM CORPORATION, Lititz, PA (US)

(72) Inventors: Andrew Gauker, Shillington, PA (US); Christopher J. Kamery, Lancaster, PA (US); Marko Konstantin Lubic, Shillington, PA (US); Robert T. Cruz, Lititz, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 194 days.

This patent is subject to a terminal disclaimer.

(21) Appl. No.: 14/262,370

(22) Filed: Apr. 25, 2014

(65) Prior Publication Data

US 2014/0318464 A1 Oct. 30, 2014

Related U.S. Application Data

(63) Continuation of application No. 13/465,728, filed on May 7, 2012, now Pat. No. 8,739,733, which is a continuation of application No. 12/591,289, filed on Nov. 16, 2009, now abandoned.

(60) Provisional application No. 61/202,508, filed on Mar. 6, 2009.

(51) Int. Cl.
*A01K 39/024* (2006.01)
*A01K 39/02* (2006.01)
*A01K 39/04* (2006.01)

(52) U.S. Cl.
CPC ............ *A01K 39/0206* (2013.01); *A01K 39/02* (2013.01); *A01K 39/024* (2013.01); *A01K 39/04* (2013.01)

(58) Field of Classification Search
CPC ...... A01K 39/02; A01K 39/024; A01K 39/04; A01K 39/0206
USPC ......... 119/72, 74, 77, 78, 79, 80, 52.3, 52.2, 119/57.8, 57.9; D30/121, 132, 133
See application file for complete search history.

(56) References Cited

U.S. PATENT DOCUMENTS

| 645,680 | A | 3/1900 | Chapman |
| 2,097,719 | A | 11/1937 | Brembeck |
| 2,623,500 | A | 12/1952 | Riley et al. |
| 3,016,044 | A | 1/1962 | Sollars |
| 3,543,729 | A | 12/1970 | Davis |
| 3,610,206 | A | 10/1971 | Davis |
| 4,224,900 | A | 9/1980 | Truhan |

(Continued)

FOREIGN PATENT DOCUMENTS

GB 2 189 870 11/1987

*Primary Examiner* — Trinh Nguyen
(74) *Attorney, Agent, or Firm* — Jacobson Holman, PLLC.

(57) ABSTRACT

A top-fill hummingbird feeder is provided having a liquid container with a liquid flow opening at a lower end and a removable cap at an upper end, a feeding basin positioned below the liquid container, and a valve or sealing mechanism associated with the liquid flow opening and the feeding basin. The feeding basin includes an upwardly extending cylindrical well that receives the lower end of the liquid container, and the valve or sealing mechanism includes a float valve associated with the well. The feeding basin is filled by gravity feed of the liquid in the container through the liquid flow opening when the sealing mechanism is open. When the feeding basin reaches a full position, the liquid (Continued)

nectar raises the float valve which, in turn, acts to close the liquid flow opening.

11 Claims, 15 Drawing Sheets

(56) References Cited

U.S. PATENT DOCUMENTS

| | | | |
|---|---|---|---|
| 4,254,794 A | 3/1981 | Smith | |
| 4,947,798 A | 8/1990 | De Wispelaere | |
| 5,303,674 A | 4/1994 | Hyde, Jr. | |
| 5,682,835 A | 11/1997 | Walter et al. | |
| 7,231,890 B2 | 6/2007 | Colvin | |
| 7,234,418 B2 | 6/2007 | Fort, II et al. | |
| 7,600,487 B2 | 10/2009 | Stone et al. | |
| 7,946,249 B2 | 5/2011 | Colvin et al. | |
| 8,011,323 B2 | 9/2011 | Vaughn, Jr. et al. | |
| 8,051,803 B2 | 11/2011 | Gauker et al. | |
| 2003/0226514 A1 | 12/2003 | Cote | |
| 2007/0272161 A1 | 11/2007 | Stone et al. | |
| 2007/0289540 A1 | 12/2007 | Stone et al. | |
| 2008/0251025 A1 | 10/2008 | Guay et al. | |
| 2008/0257273 A1 | 10/2008 | Carter et al. | |
| 2010/0132618 A1 | 6/2010 | Stone et al. | |
| 2010/0224132 A1 | 9/2010 | Gauker et al. | |
| 2010/0229801 A1 | 9/2010 | Stone et al. | |
| 2010/0242848 A1 | 9/2010 | Vaughn, Jr. et al. | |
| 2011/0100300 A1 | 5/2011 | Carter et al. | |
| 2011/0168101 A1 | 7/2011 | Guay et al. | |
| 2011/0209666 A1 | 9/2011 | Stone et al. | |
| 2011/0297095 A1 | 12/2011 | Cruz et al. | |
| 2012/0079988 A1 | 4/2012 | Vaughn, Jr. et al. | |
| 2012/0132145 A1 | 5/2012 | Gauker et al. | |
| 2012/0216750 A1 | 8/2012 | Cruz et al. | |
| 2012/0279454 A1 | 11/2012 | Gauker et al. | |
| 2013/0042814 A1 | 2/2013 | Mateer et al. | |
| 2013/0042815 A1 | 2/2013 | Colvin et al. | |

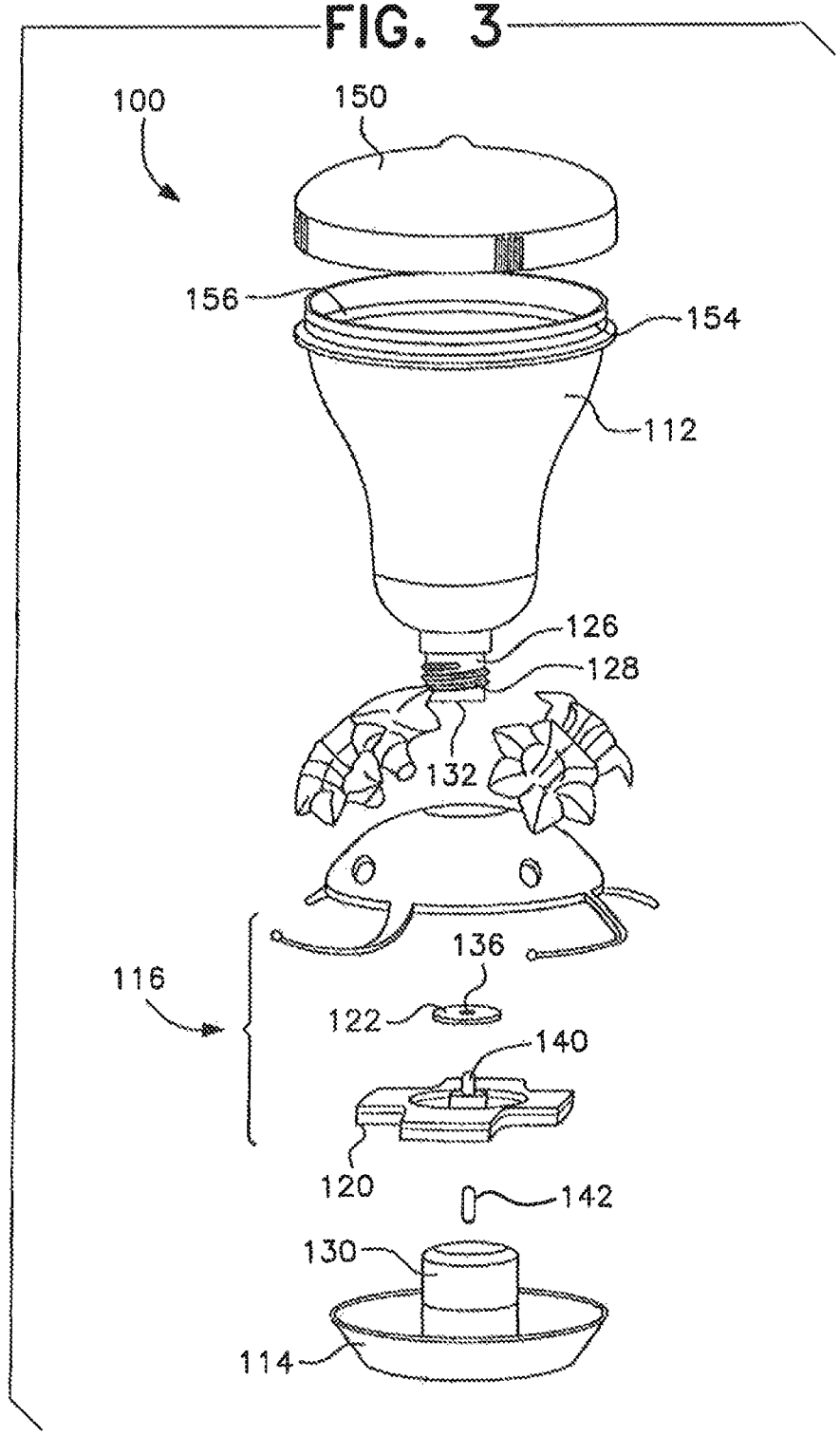

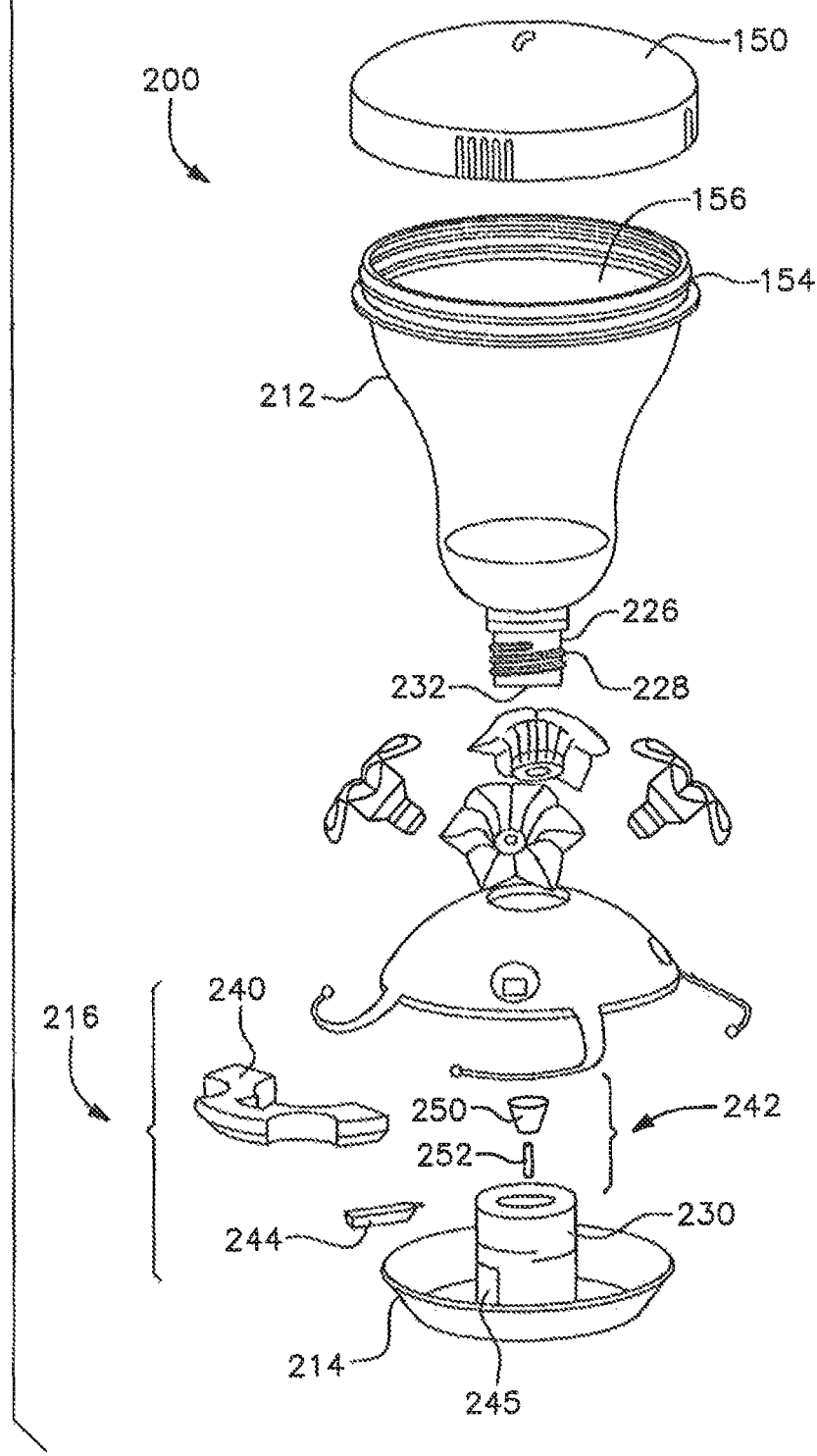

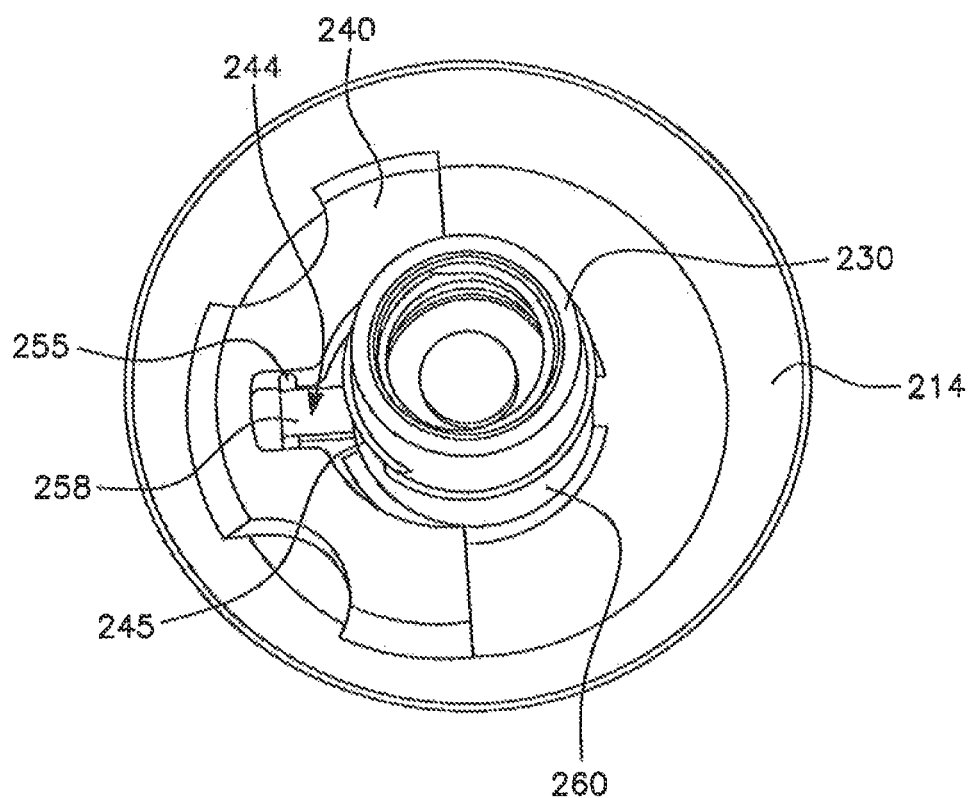

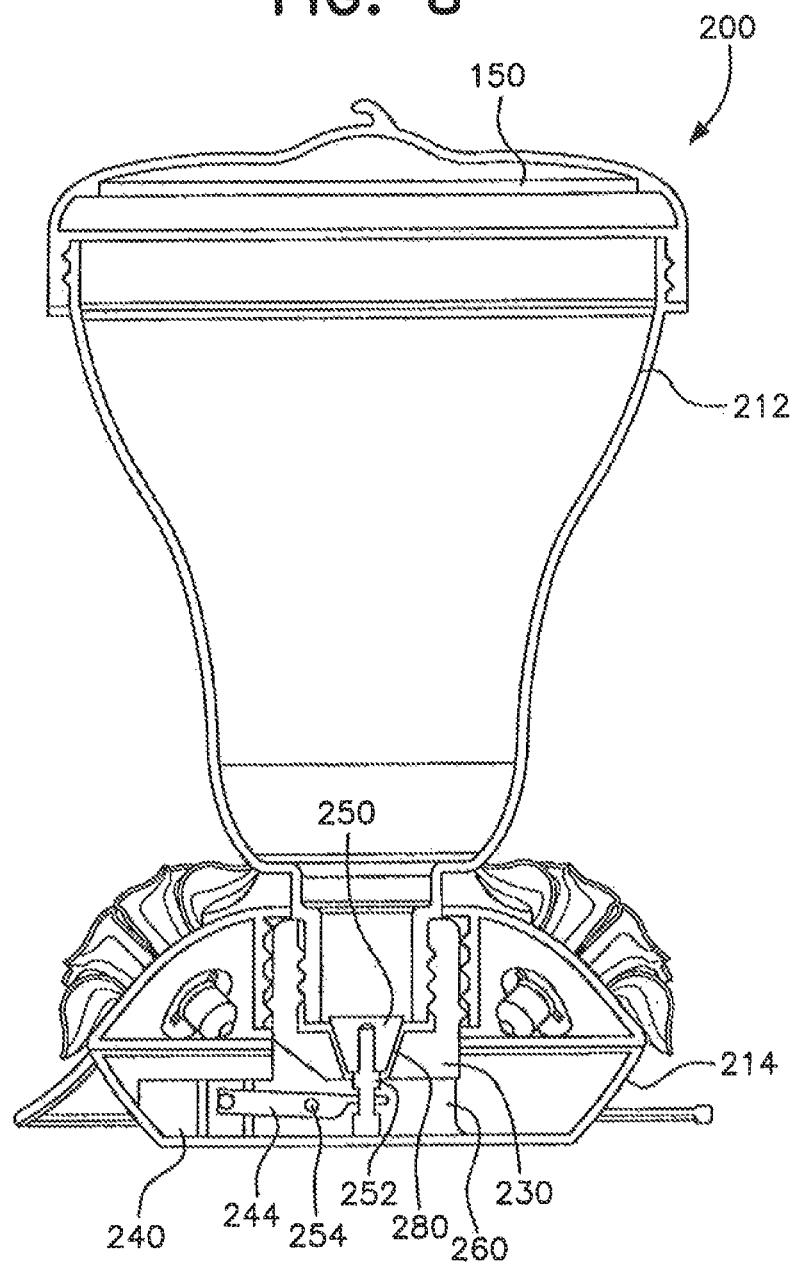

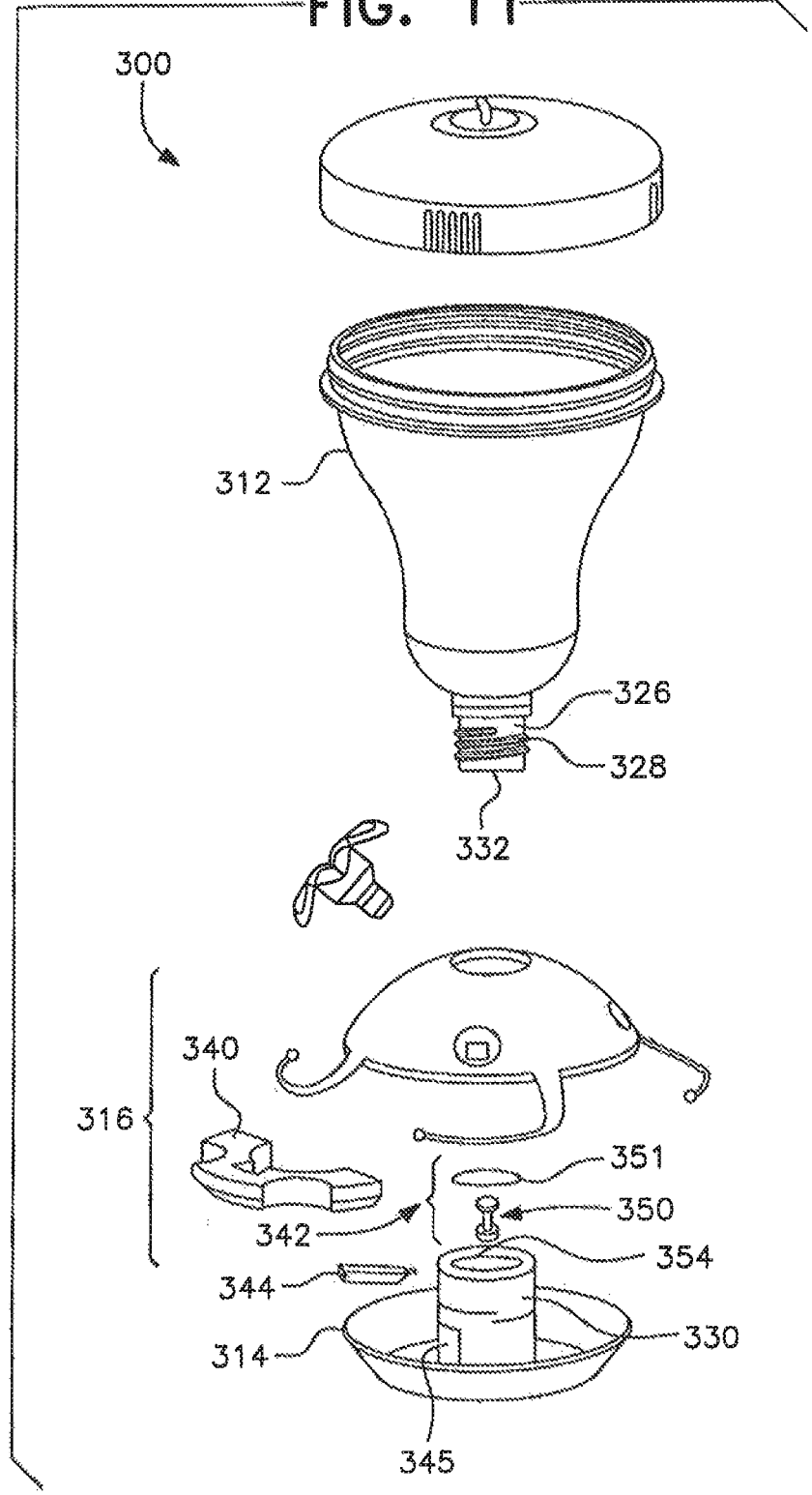

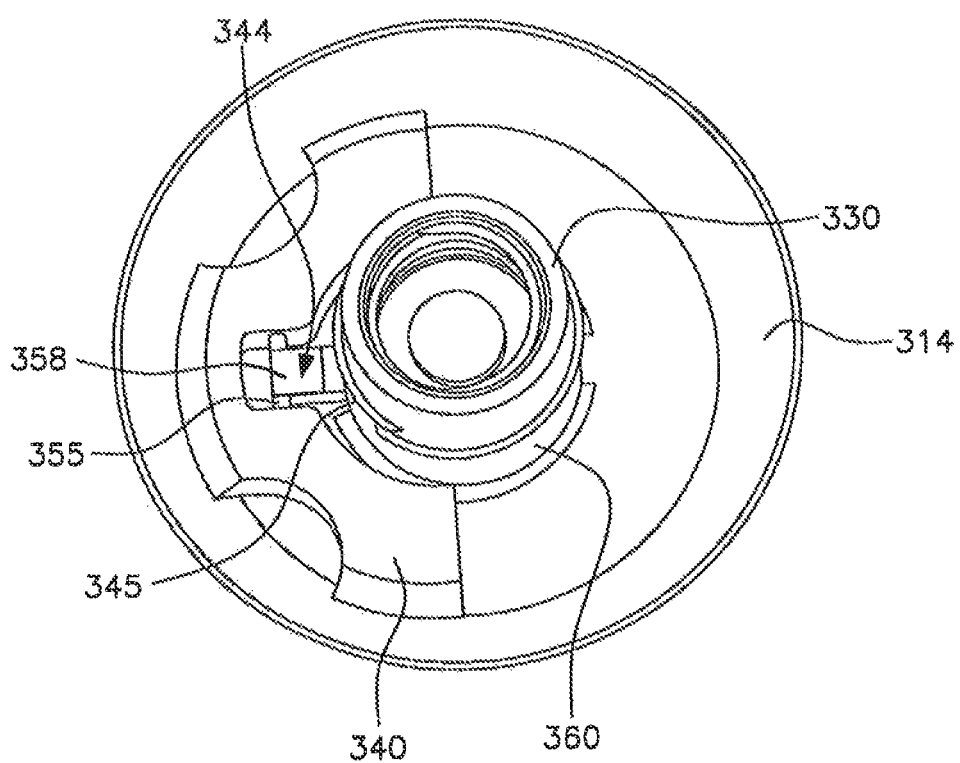

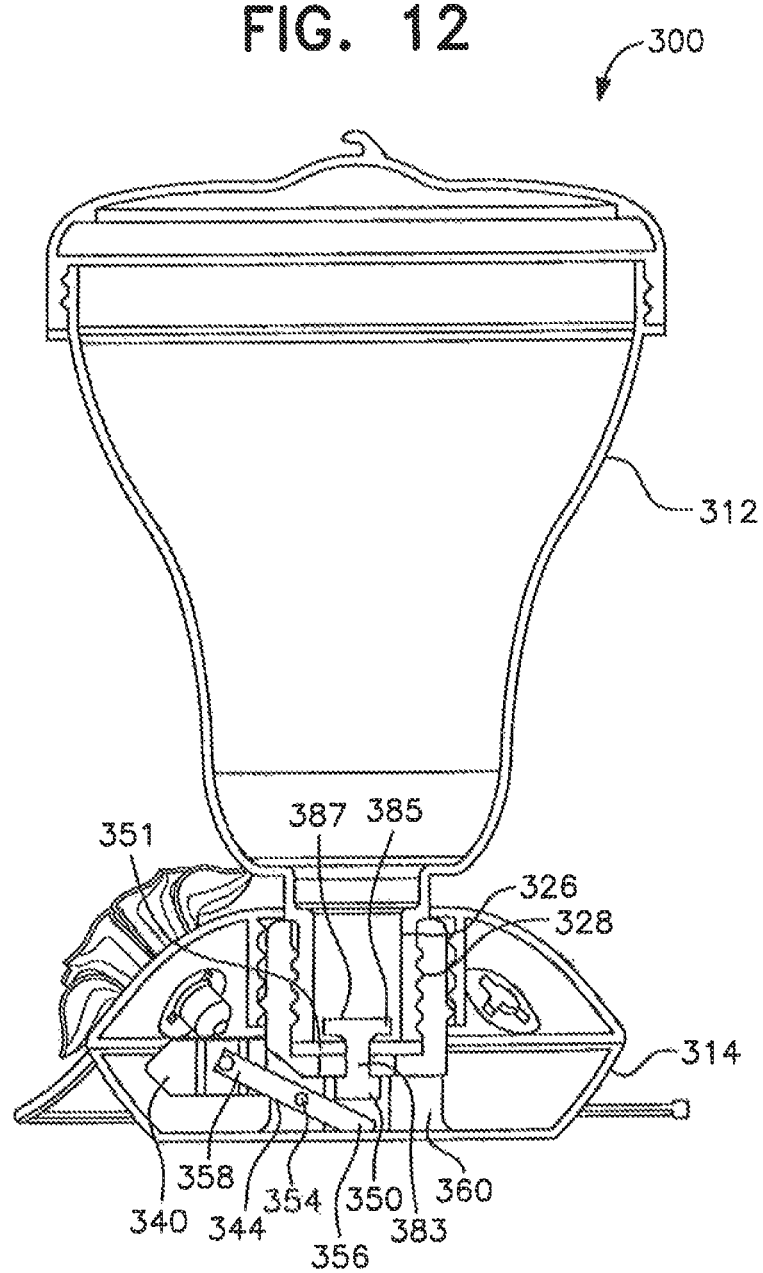

TOP-FILL HUMMINGBIRD FEEDER WITH FLOAT VALVE BASE CLOSURE MECHANISM

This is a continuation application of U.S. application Ser. No. 13/465,728, filed May 7, 2012, which was a continuation application of application Ser. No. 12/591,289, filed Nov. 16, 2009, and now abandoned, which claimed the priority of U.S. Provisional application, Ser. No. 61/202,508 filed Mar. 6, 2009, the priority of which is hereby claimed.

BACKGROUND OF THE INVENTION

Field of the Invention

The present invention is related to the field of bird feeders and, more particularly, to top-fill hummingbird feeders.

Description of the Related Art

People who live in an area inhabited by hummingbirds frequently try to promote their presence by the use of hummingbird feeders. Hummingbird feeders differ from ordinary bird feeders because hummingbirds feed on nectar or simulated nectar, which are liquid, instead of the dry food consumed by most birds. Simulated nectar is typically formed from water sweetened with sugar or honey. In many hummingbird feeders, the nectar (or simulated nectar) is stored in a reservoir and conveyed to simulated flowers where a perch may be provided so that the hummingbird can land and, having a long, slender beak, insert it into the access apertures in the simulated flower and feed.

Most hummingbird feeders have one of two basic designs. One includes an inverted top container which empties into a lower reservoir or feeding basin from which the birds feed. The vacuum at the top of the container (or put another way, the outside air pressure) keeps the liquid in the top container from draining out too rapidly. The other common feeder design consists of a container with holes in its cover through which the hummingbirds reach to feed. This latter style of feeder suffers from the problem that it must be refilled very often, because the level of food is constantly being reduced by the feeding.

The so-called "vacuum-type" feeders also have problems. For example, they can only be filled by dismantling the feeder and removing the top container from its feeding position. Ordinarily, the consumer must invert the feeder in order to refill it, with the attendant risks of spillage, and requires a certain amount of manual dexterity to create the necessary vacuum. Moreover, because a vacuum is required, these designs are limited to a single opening for filling and cleaning. This opening is typically small, which restricts access to the interior of the container and makes it more difficult to effectively clean the container. Additionally, vacuum feeders can corrode or be inefficient, permitting the nectar to leak and creating an increased risk of insect contamination.

One product which has been available in the market is the Garden Song Top Fill Hummingbird Feeder from Opus Incorporated. The Opus feeder includes an upstanding liquid container with a large top opening and a small cylindrical lower opening which is screw-threaded into an upstanding cylindrical collar positioned in the center of a feeding basin or liquid tray. The top opening is closed with a cover that seals the container to create a vacuum as the liquid level recedes downwardly in the container. An internal, rotatable ring or valve mechanism has an upstanding cylindrical wall which surrounds the cylindrical collar inside the feeding basin.

The wall of the cylindrical collar has a plurality of ports, and the cylindrical wall of the rotatable ring has a plurality of corresponding openings. When the openings in the rotatable ring are aligned with the ports of the collar using an externally accessible lever, nectar can flow out of the container lower opening, through the aligned ports and openings, and into the feeding basin or liquid tray. When the rotatable ring is rotated using the externally accessible lever, so that its openings are not aligned with the ports of the collar, the nectar flow from the container to the feeding basin is cut off. In this condition, the cover can be removed from the container top opening for (re)filling the container without nectar in the container flowing out through the collar to flood and overflow the feeding basin or liquid tray. This design also permits the top opening to be large enough to facilitate easy cleaning of the bottle.

There have also been modular designs for hummingbird feeders in which a common functional feeding module is utilized in conjunction with changeable decorative outer claddings. However, such prior art hummingbird modular feeders suffer the same drawbacks as discussed above.

SUMMARY OF THE INVENTION

The present invention is directed to a hummingbird feeder which includes a generally upstanding reservoir bottle or liquid container containing a column of nectar and having a large opening at its top end. A removable top or cap is screw-threaded onto the top end to close and cover the top end opening. The top is vented to prevent a vacuum condition and allow atmospheric pressure to act on the column of nectar. The bottom of the bottle or container has a lower bottom opening, preferably in the form of a bottleneck-shaped cylindrical extension with external threads that can be screw-threaded into an upstanding well of a feeding basin that has a plurality of feeding ports in a known arrangement. A generally cylindrical float valve positioned in the feeding basin well and floating in the liquid nectar acts to close the bottleneck central opening when the feeding basin is filled with liquid nectar to the prescribed level. When the level of liquid nectar drops, the vertical height of the float valve within the basin is also lowered which allows fluid from the container to flow through the bottleneck opening to refill the basin.

According to a first embodiment, the wall forming the cylindrical extension of the bottleneck converges radially to form a conical closure having a sloped outer surface. A small opening at the apex of the conical closure allows nectar to flow from the liquid container into the feeding basin when the float valve, which has a central portion configured to engage the conical closure in a first position, is spaced away from the sloped outer surface in a second position.

According to a second embodiment, the free or lower end of the bottleneck extension is provided with a seal plate having a small central opening with conically tapered side walls. The float valve has a complementarily tapered truncated conical projection that plugs the central opening when the valve rises to an upper position.

In a third embodiment, the cylindrical well is provided a flat sealing edge portion that surrounds a hollow center portion having an inverted truncated conical shape with sloped sides. Contained and vertically movable within the center portion is a plug that fits in sealing engagement with the sloped sides. The plug is mounted on a post which initiates vertical movement of the plug in response to a lever arm coupled at a first end to the post and at a second end to a float. When the float is in a low position, the lever arm exerts sufficient force on the post and the plug to lift them upwardly to open the hollow center portion of the well so that nectar can flow into the feeding basin. As the float rises, and with it the second of the lever arm, the post and plug are allowed to move downwardly in response to liquid pressure in the container to seal the hollow center portion.

Finally, in a fourth embodiment which is similar to the third embodiment, the well has a sealing plate with a generally cylindrical central hole. The plug has a post portion that is vertically movable within the hole, and an enlarged head that seals the hole when the plug is in its lowered position. As with the third embodiment, movement of the plug to open the hole is initiated by a float and lever mechanism responsive to nectar level in the feeding basin.

In view of the foregoing, it is an object of the present invention to provide a reliable, consumer-friendly hummingbird feeder having a liquid-holding container or bottle with a large open top for easy top filling and cleaning of the container.

Another object of the present invention is to provide a hummingbird feeder in which the liquid-holding container or bottle does not have to be inverted after filling and which does not rely on a vacuum condition in the liquid-holding container or bottle to control the flow the nectar into the feeding basin.

A further object of the present invention is to provide a hummingbird feeder with a liquid-holding container or bottle having a bottleneck-shaped lower end with an opening that is received within an upstanding cylindrical well on the feeding basin and opened and closed by a sealing or valve mechanism in the form of a float valve positioned in the well.

A still further object of the present invention is to provide a hummingbird feeder in accordance with the preceding objects and one embodiment, in which the bottleneck-shaped lower end of the container is provided with a bottom having a cone-shaped surface and/or opening, preferably located centrally therein, to mate with a cone-shaped surface and/or projection on the upper surface of the float valve that closes the opening when the liquid nectar in the feeding basin reaches a prescribed level.

An additional object of the present invention is to provide a hummingbird feeder in accordance with the preceding objects, in which a centering mechanism within the upstanding basin well keeps the float valve aligned with the opening in the bottom surface of the container lower end.

Yet another object of the present invention is to provide a hummingbird feeder generally in accordance with the preceding objects and another embodiment in which the bottleneck-shaped lower end of the container is provided with a bottom opening that is closed by a plug that is vertically moved by a lever arm and float mechanism coupled to the plug and responsive to nectar level in the feeding basin.

Still another object of the present invention is to provide a hummingbird feeder in accordance with the preceding objects, which has components that can be easily manufactured from readily available and known materials and that can be easily assembled for ease and economy of manufacture and easily disassembled and reassembled for easy cleaning and which will be sturdy and long lasting in operation and use.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 3 is an exploded side perspective view of the components of a top-fill hummingbird feeder in accordance with a second embodiment of the present invention.

FIG. 7 is an exploded side perspective view of the components of a top-fill hummingbird feeder in accordance with a third embodiment of the present invention.

FIG. 7A is a perspective view of the float valve as mounted in the cylindrical well of the feeder shown in FIG. 7.

FIG. 8 is a sectional assembled side view of the feeder shown in FIG. 7.

FIG. 11 is an exploded side perspective view of the components of a top-fill hummingbird feeder in accordance with a fourth embodiment of the present invention.

FIG. 11A is a perspective view of the float valve as mounted in the cylindrical well of the feeder shown in FIG. 11.

FIG. 12 is a sectional assembled side view of the feeder shown in FIG. 11.

DETAILED DESCRIPTION OF THE PREFERRED EMBODIMENTS

Figure 1:
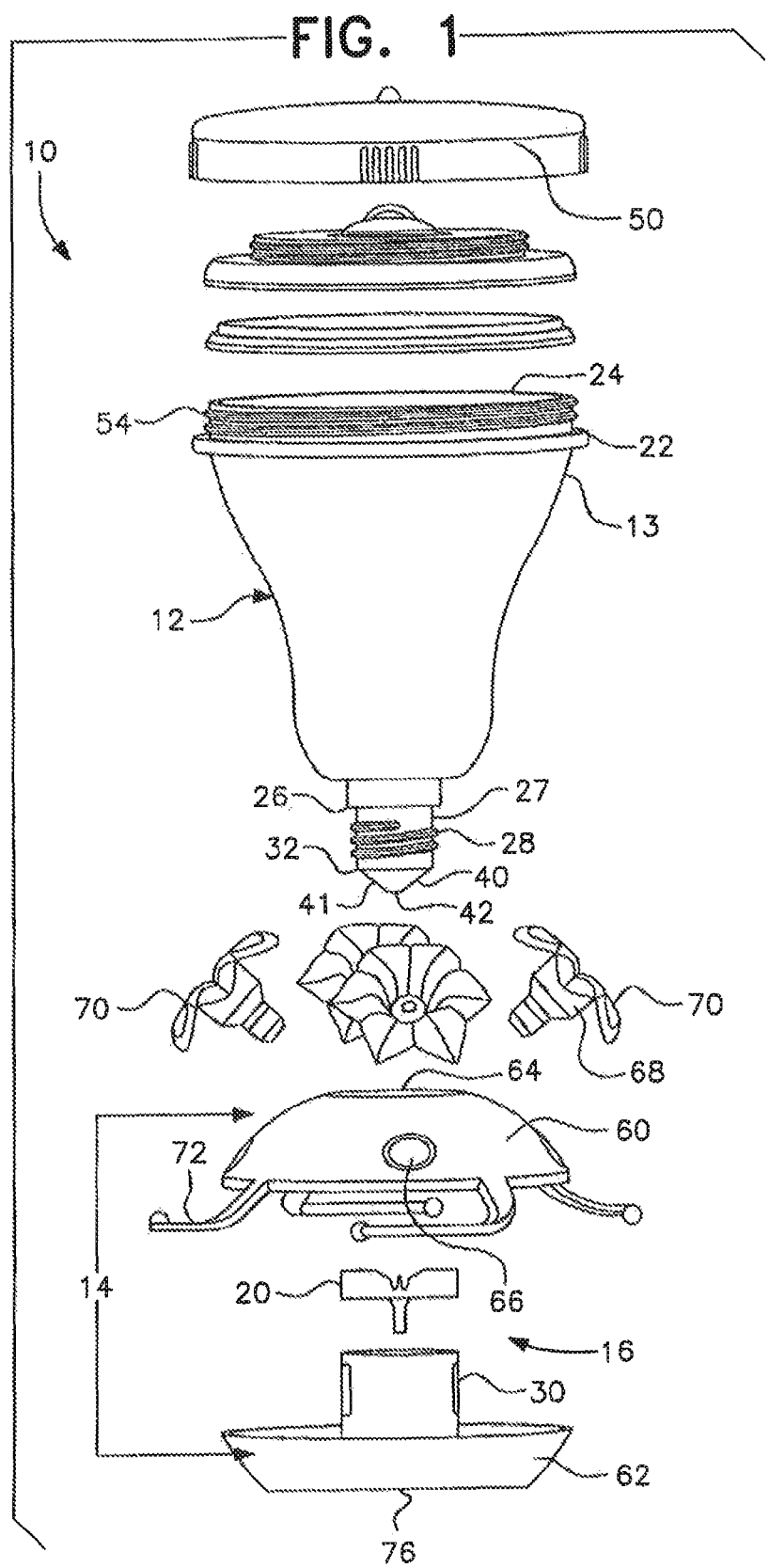
FIG. 1 is an exploded side view of the components of a top-fill hummingbird feeder in accordance with a first embodiment of the present invention.

Although four preferred embodiments of the invention are explained in detail, it is to be understood that the embodiments are given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

As shown in FIG. 1, a top-fill hummingbird feeder in accordance with a first embodiment of the present invention is generally designated by reference numeral 10. The feeder consists of a reservoir bottle or liquid container generally designated by reference numeral 12, a feeding basin generally designated by reference numeral 14, and a sealing or valve mechanism generally designated by reference numeral 16. As shown in the enlarged view of FIG. 2, the sealing or valve mechanism 16 includes a float valve 20 configured for engagement with the lower end of the liquid container 12.

Figure 2:
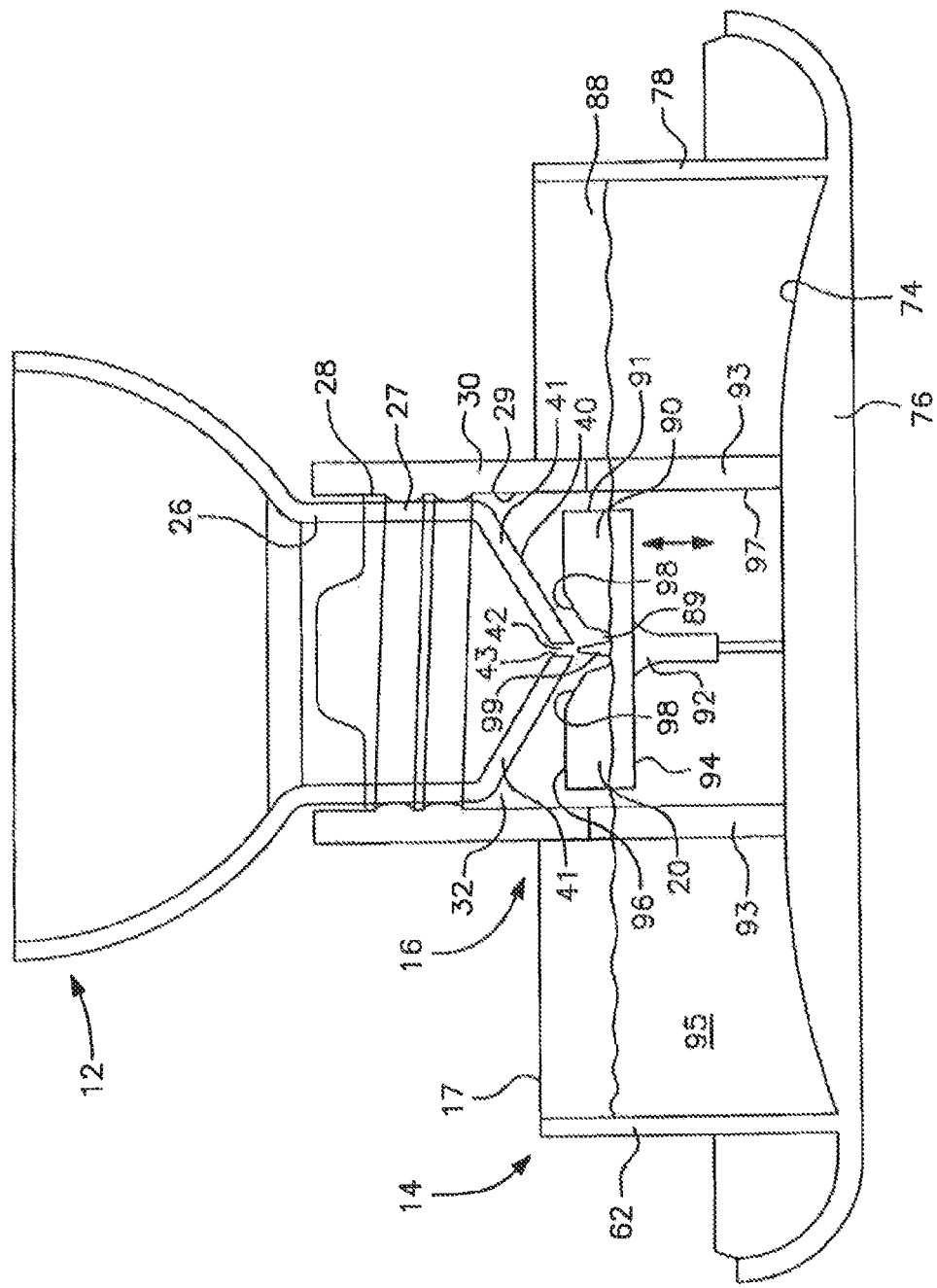
FIG. 2 is an enlarged sectional side view of the feeding basin, sealing mechanism and lower end of the liquid container of the feeder shown in FIG. 1.

The liquid container 12 has an upstanding neck 22 forming a large opening 24 at its upper end 13 for easy filling and cleaning of the liquid container. The bottom of the liquid container forms a generally cylindrical bottleneck-shaped extension 26 with external threads 28 so that it can be screw-threaded into the mating threads of a cylindrical wall 29 of an upwardly extending cylindrical well 30 of the feeding basin 14. At the free end 32 of the bottleneck extension 26, the cylindrical wall 27 forming the bottleneck converges radially to form a sealing wall or closure 40 having a sloped outer surface 41. At the apex of the conical closure 40 is a small central opening 42. The diameter of the central opening 42 is much smaller than the diameter of the bottleneck, as shown in FIG. 2, and preferably includes a downwardly tapering conical side wall 43.

A removable top or cap 50, secured in place such as by threads 54 that mate with corresponding threads (not shown) inside the cap, closes off the large opening 24 at the upper end 13 of the liquid container 12 when the cap is tightened. The cap 50 is vented to prevent a vacuum condition and to allow atmospheric pressure to act on the column of nectar being fed into the feeding basin from the container.

Preferably, the feeding basin 14 is generally circular in plan view and may be made in two parts including a cover 60 and a base 62 molded of suitable polymer material. When the feeder is assembled, the cover 60 and the base 62 are sealingly coupled to one another in any manner suitable for sealingly joining plastic parts, such as by a threaded engagement, adhesive, or other known connecting mechanism, to form the basin 14.

The basin cover 60 has a central opening 64 through which the bottleneck extension 26 of the container extends. The cover is also molded to include a plurality of openings 66 spaced around a periphery thereof for receiving feeding ports 68. The feeding ports 68 preferably include an ornamental part 70 to enhance the overall appearance of the feeder and increase its attractiveness to the hummingbirds. In the preferred embodiment shown in FIG. 1, the ornamental part 70 resembles flower petals. The cover is also preferably formed with perches 72 to support the hummingbirds when feeding.

The upwardly extending cylindrical well 30 is preferably integrally molded with the basin base 62, but it can be formed separately and then attached to the bottom inner surface 74 of the base in any manner known by persons of ordinary skill in the art to be suitable for sealingly joining plastic parts.

The base 62 includes a bottom 76 and a curved, upwardly directed base wall 78 that define a fluid holding area 88 of the base. The upwardly extending cylindrical well 30 is preferably centrally positioned with respect to the bottom 76 and projects above the upper wall 17 of the basin 14. The wall 29 of the cylindrical well 30 has slots 93 at its lower edge which allow liquid nectar in the fluid holding area 88 to move freely in and out of the well.

As shown in FIG. 2, the sealing or valve mechanism 16 includes a float valve 20 positioned inside the upwardly extending well 30. The float valve 20 has a float 90 and a spacing member 92. The periphery 91 of the float 90 conforms with, but is spaced slightly away from, the inner wall 97 of the well 30, thus centering the float valve 20 in the well 30. Hence, with the float 90 floating on the surface of the liquid nectar 95, the float valve 20 can move up and down with the level of the liquid nectar in the basin 14. The spacing member 92 keeps the float valve 20 spaced at a minimum vertical distance or height above the bottom 74 of the basin base 62, regardless of the nectar level.

Preferably, the float 90 is generally cylindrical or disc-shaped to conform with the wall 29 of the cylindrical well 30. In its preferred embodiment, the float 90 has a substantially flat bottom surface 94 that is coupled to or integral with the spacing member 92. The upper surface 96 of the float has a central portion 98 that slopes downwardly toward the center of the float 90 at an angle that substantially complements the sloped surface 41 of the conical closure 40 on the bottleneck 26 of the liquid container. At the bottom of the sloped central portion 98 of the float upper surface 96, an annular channel 89 is formed that surrounds an upwardly extending, tapered projection 99.

When the feeding basin 14 is full, the level of the nectar 95 raises the float valve 20 to bring it into abutment with the sloped surface 41 of the closure 40 of the bottleneck. In this position, the tapered projection 99 is received within and closes the central opening 42 in the closure 40, preventing further nectar in the container 12 from flowing into the basin. As the feeder is thereafter used by feeding birds, the level of nectar 95 in the basin 14 will drop. Since the float valve 20 rises and falls with the nectar level, the lowering of the nectar 95 creates a space between the surface 41 of the closure 40 and the upper surface 96 of the float 90, once again allowing liquid to flow from the container 12 into the basin 14 through the opening 42 until the basin is again filled so as to bring the upper surface 96 of the float 90 into abutment with the sloped surface 41 of the closure 40. In this way, the feeder basin is continually refilled by the quantity of liquid in the container.

To assemble the feeder from an empty state, the bottleneck portion 26 of the liquid container 12 is screwed into the internal threads 28 on the wall 29 of the cylindrical well 30, bringing the closure 40 to a position near, but spaced above, the sloped portion of the float 90. The liquid container is then filled through the open top thereof. As liquid nectar 95 enters the container 12, the nectar is permitted to flow into the fluid holding area 88 of the feeder basin 14 through the central opening 42 in the closure 40 and the slots 93 in the well 30. As the basin fills up, the float valve 20 rises with the liquid level in the basin until the sloped surfaces 41, 98 of the closure and the float are in abutment and the projection 99 on the float is fully inserted within the closure central opening 42. In this position, the opening 42 is closed by the projection 99 and the abutment of the sloped surfaces 98, 41 on the upper surface 96 of the float 90 with the lower surface of the closure 40. The flow of liquid nectar into the basin is thus stopped and the remainder of the container can be filled as desired. Thereafter, the container can be topped off and/or refilled at any time, as needed, by opening the top thereof and adding additional liquid. The upward pressure of the float valve 20 against the closure 40 once the basin is full keeps too much liquid from entering the basin and overflowing therefrom.

To disassemble the feeder for cleaning, the steps taken to assemble the feeder are reversed. The container 12 is unscrewed from the well 30 of the basin 14 and both parts can then be washed in water, preferably with warm soapy water, and then rinsed. Reassembly is then accomplished as described above.

As already noted, the sealing of the closure opening 42 when the basin 14 is full allows the container 12 to be refilled through the top opening without allowing fluid in the basin to escape through the feed ports 66. This configuration greatly increases convenience to the user as compared with hummingbird feeders that have to be inverted for filling in that inversion-fill feeders cannot be "topped off" without losing all of the liquid nectar still in the base since the entire feeder must be turned upside down to fill the reservoir and replace the base.

A float valve style hummingbird feeder in accordance with a second embodiment of the present invention is shown in FIGS. 3-6 and is generally designated by reference numeral 100. The feeder consists of a reservoir bottle or liquid container generally designated by reference numeral 112, a feeding basin generally designated by reference numeral 114, and a sealing mechanism generally designated by reference numeral 116 that includes a float valve 120 and a seal plate 122 configured for engagement with the lower end 132 of the liquid container 112.

A removable top or cap 150, secured in place such as by threads 154 that mate with corresponding threads 155 inside the cap, closes off the large opening 156 at the upper end of the liquid container 112 when the cap is tightened. The cap 150 is vented to prevent a vacuum condition and allow atmospheric pressure to act on the column of nectar being fed into the feeding basin from the container in the same manner as in the first embodiment.

Figure 3A:
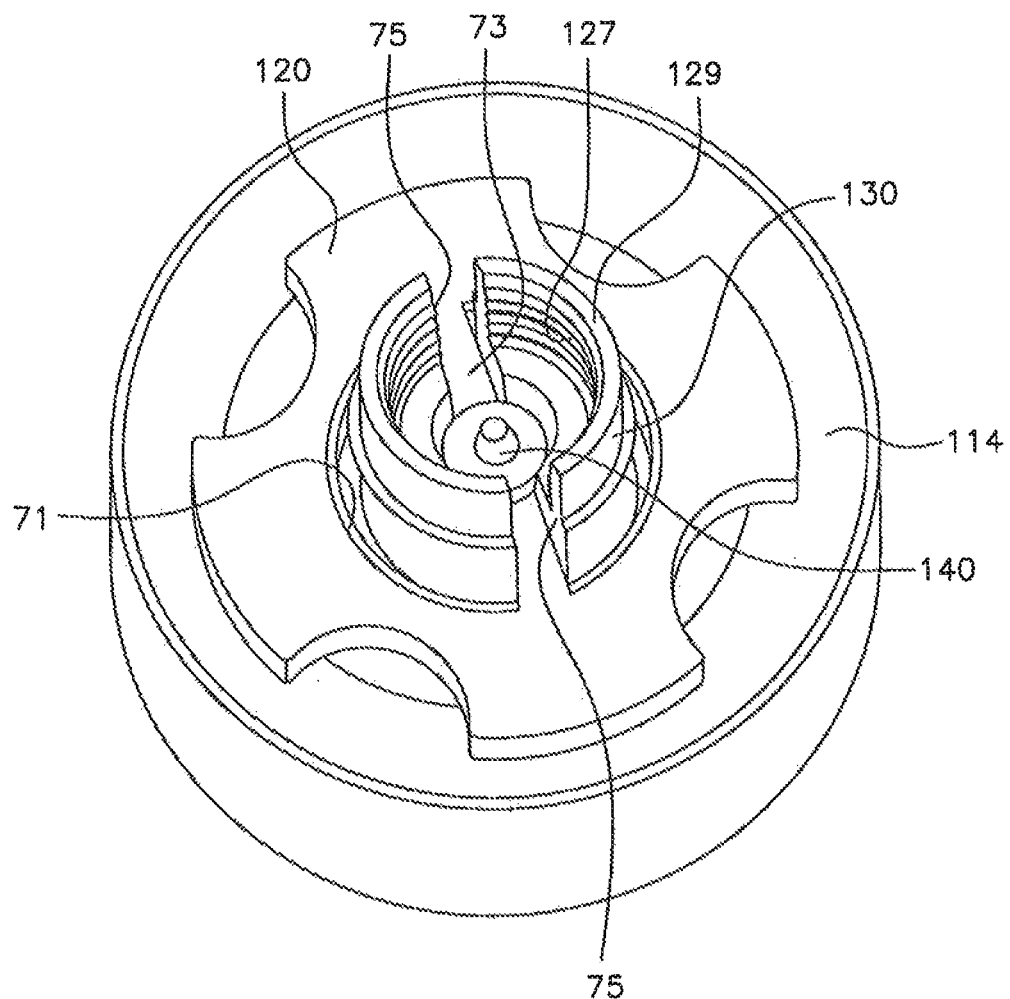
FIG. 3A is a perspective view of the float valve as mounted in the cylindrical well of the feeder shown in FIG. 3.
Figure 4:
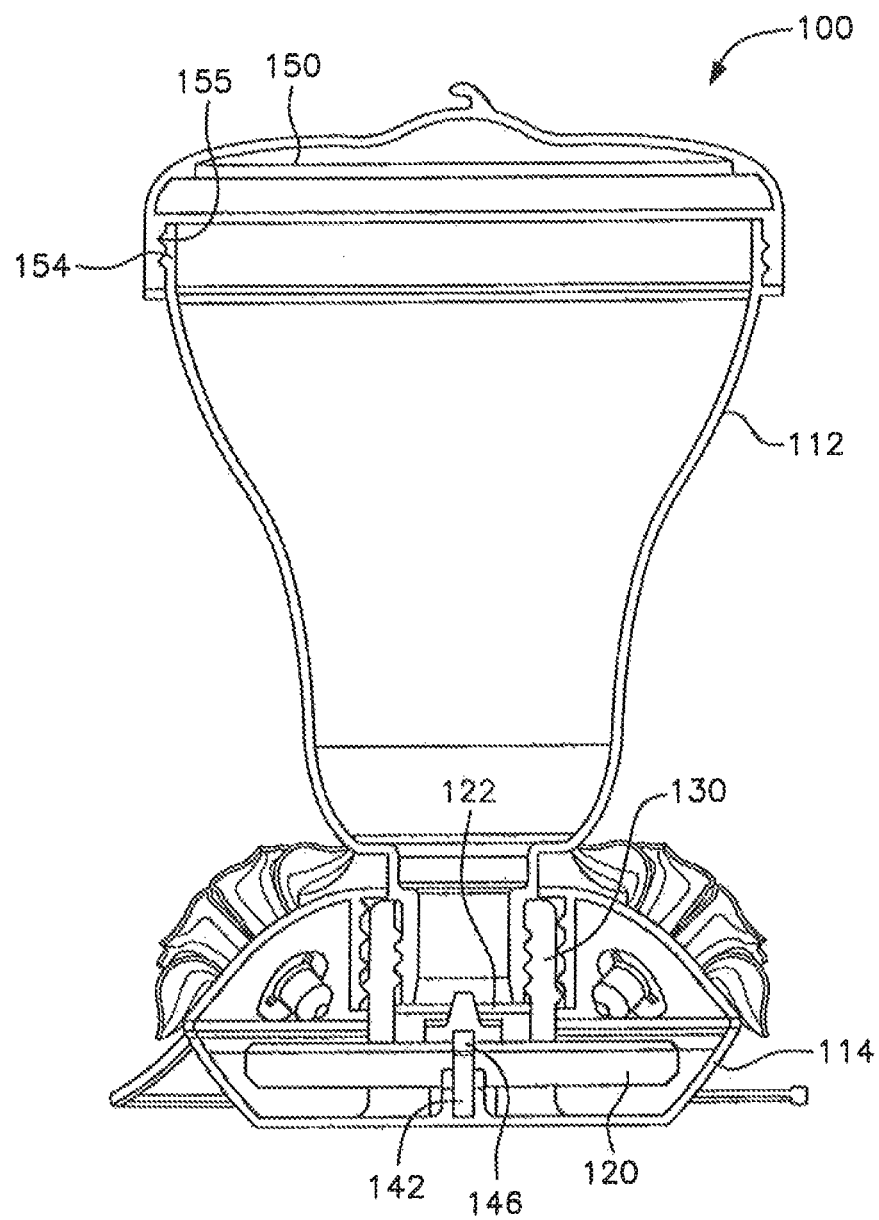
FIG. 4 is a sectional assembled side view of the feeder shown in FIG. 3.

The bottom of the liquid container 112 forms a generally cylindrical bottleneck-shaped extension 126 with external threads 128 so that it can be screw-threaded into the mating threads 127 of a wall 129 of an upwardly extending cylindrical well 130 of the feeding basin 114, shown in FIG. 3A. The bottleneck extension 126 has an open lower end 132, which is partially closed by the seal plate 122 when the bottleneck extension 126 is screw-threaded into the cylindrical well 130 and its lower end 132 engages the periphery of the seal plate 122. The seal plate 122 is preferably made of any soft elastomer, rubber or other flexible sealing material such as urethane, etc.

According to the second embodiment, the float valve 120 has a central opening 71 through which the well 130 extends. The central opening 71 is spanned across its diameter by a bridge 73 having a truncated conical projection 140 positioned in a center thereof. The wall 129 of the well 130 is split to form opposing channels 75 that receive the bridge 73 as shown in FIG. 3A.

Figure 5:
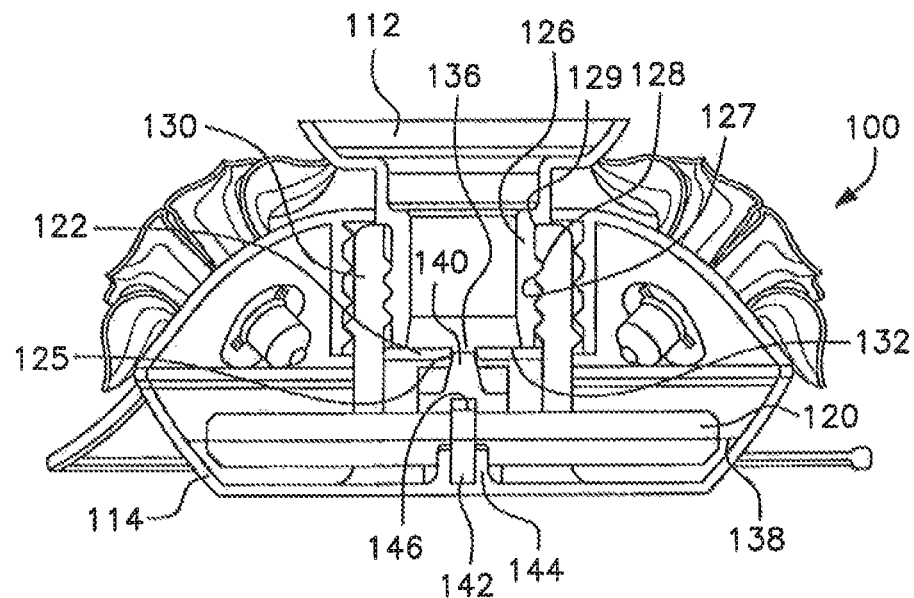
FIG. 5 is an enlarged sectional side view of the feeding basin, sealing mechanism and lower end of the liquid container of the feeder shown in FIG. 3, depicted in the open position.

The seal plate 122 has a central aperture 136 through which nectar in the container 112 flows to fill the feeding basin 114 when the float valve 120 is in the open position shown in FIG. 5. The aperture 136 preferably has a conical side wall tapering downwardly to complement the shape of the tapered truncated conical projection 140. The open position is obtained when the level 138 of the nectar in the feeding basin is low and the float valve 120, floating in the nectar, is also low so that the projection 140 is spaced away from the opening 136 in the seal plate 122 to form a flow channel 125. As nectar flows into the feeding basin 114, however, the level of the nectar and, in turn, the vertical position of the float valve 120 and the projection 140 on the bridge 73 thereof, rises until the float valve reaches its upper position at which point the feeding basin is "full".

Figure 6:
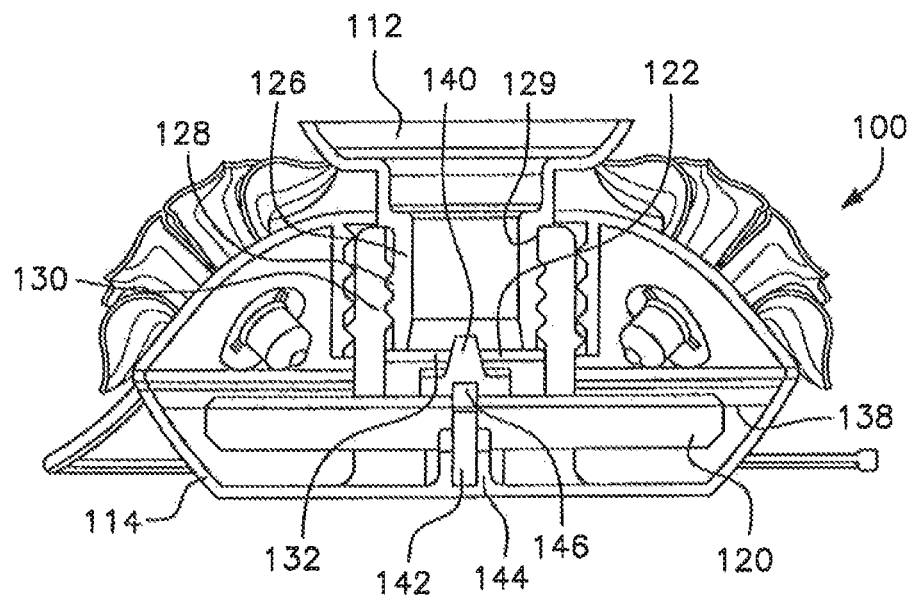
FIG. 6 is an enlarged sectional side view of the feeding basin, sealing mechanism and lower end of the liquid container of the feeder shown in FIG. 3, depicted in the closed position.

In the "full" position shown in FIG. 6, the upwardly directed projection 140 with the truncated conical shape extending from the center of the bridge 73 of the float valve 120 is received within the central aperture 136 in the seal plate 122. The projection 140 thereby closes or plugs the aperture 136 to prevent further flow of nectar from the container 112 into the feeding basin through the flow channel 125.

An upstanding guide pin 142 is preferably positioned centrally in a protrusion 144 at the base of the feeding basin 114 directly below the well 130. The pin 142 is received within a bore 146 formed in the center of the float valve 120 in order to laterally align the projection 140 with respect to the aperture 136 during upward and downward movement of the float valve 120.

A float valve style hummingbird feeder in accordance with a third embodiment of the present invention is shown in FIGS. 7-10 and is generally designated by reference numeral 200. The feeder consists of a reservoir bottle or liquid container generally designated by reference numeral 212, a feeding basin generally designated by reference numeral 214, and a sealing or valve mechanism generally designated by reference numeral 216. The liquid container has a large opening at its upper end that is closed by a removable cap in the same manner as in the second embodiment and with corresponding reference numerals, and therefore a discussion thereof will not be repeated here.

The bottom of the liquid container 212 forms a generally cylindrical bottleneck-shaped extension 226 with external threads 228 so that it can be screw-threaded into the mating threads of a cylindrical wall 229 of an upwardly extending cylindrical well 230 of the feeding basin 214, as shown in FIG. 7A. The bottleneck extension 226 has an open lower end 232 configured to engage with and be sealed by the sealing or valve mechanism 216.

The sealing or valve mechanism 216 includes a float 240 connected by a lever 244 to a seal assembly, generally designated by reference numeral 242. The seal assembly 242 includes a plug 250 mounted on the upper end of a generally vertical post 252 positioned centrally within the upwardly extending well 230. The lever 244 is pivotally mounted at a central part thereof by a pivot pin 254 to a base 260 of the cylindrical well 230. A first end 256 of the lever 244 is received through a port 245 in the side of the base 260 and is coupled to a lower portion of the post 252. A second end 258 of the lever 244 is coupled to the float 240 by a pivot pin 255.

Figure 9:
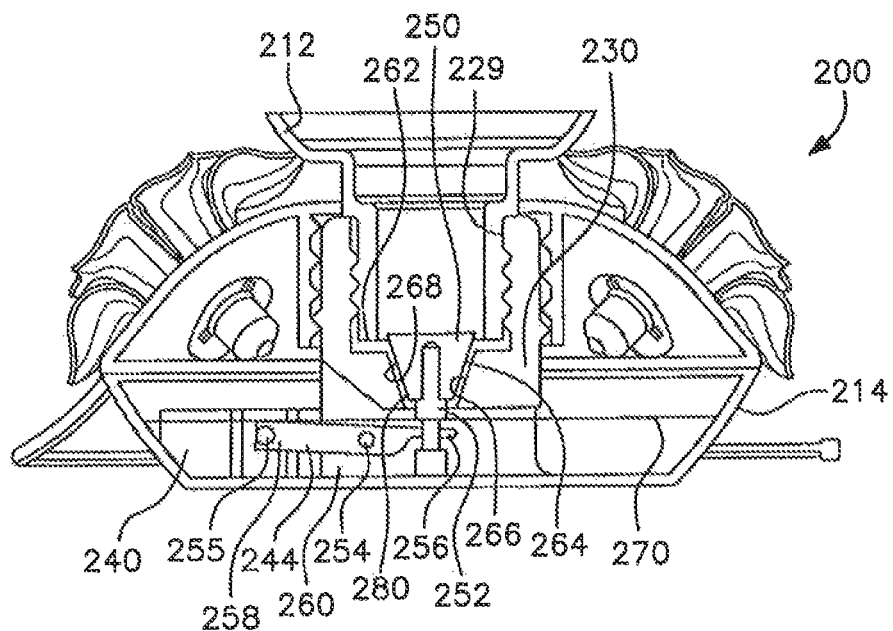
FIG. 9 is an enlarged sectional side view of the feeding basin, sealing mechanism and lower end of the liquid container of the feeder shown in FIG. 7, depicted in the open position.

The base 260 of the cylindrical well 230 includes a flat sealing edge portion 262 that surrounds a hollow center portion 264 having an inverted truncated conical shape with sloped sides 266 (see FIG. 9). The sealing edge portion 262 closes off the open lower end 232 when the bottleneck extension 226 is screw-threaded into the well 230. The plug 250 has an inverted truncated conical shape complementary with that of the hollow center portion 264 so that the sloped outer surface 268 of the plug 250 fits in sealing engagement with the sloped side surface 266 of the center portion 264 when the two are in abutment.

The plug 250 is vertically movable within the hollow center portion 264 between an upper position (shown in FIG.

9) and a lower position (shown in FIG. 10) in response to vertical movement of the post 252 upon which the plug 250 is mounted. Vertical movement of the post 252 is initiated by the position of the float 240 which, in turn, is determined by the fluid level 270 in the feeding basin 214. When the fluid level is low, as in FIG. 9, the float 240 is also in a low position. The weight of the float 240 combined with the mechanical advantage of the lever 244, provides enough force to lift the post 252 and the plug 250 against the fluid pressure in the container 212. In this upper position, the plug 250 is pushed up from the hollow center portion 264 so as to be spaced therefrom sufficiently to open a fluid flow channel 280 between the outer surface 268 of the plug 250 and the mating side surface 266 of the well base center portion 264.

Figure 10:
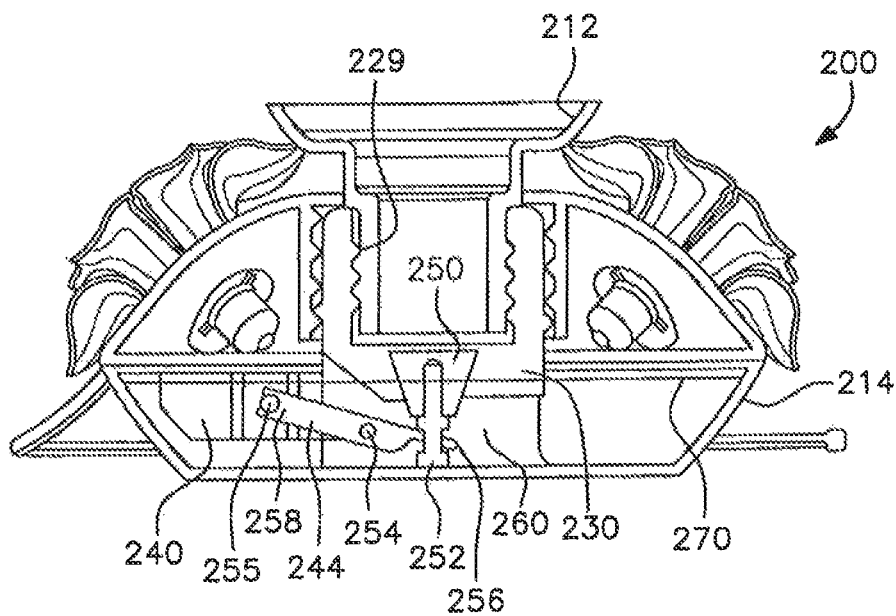
FIG. 10 is an enlarged sectional side view of the feeding basin, sealing mechanism and lower end of the liquid container of the feeder shown in FIG. 7, depicted in the closed position.
Figure 13:
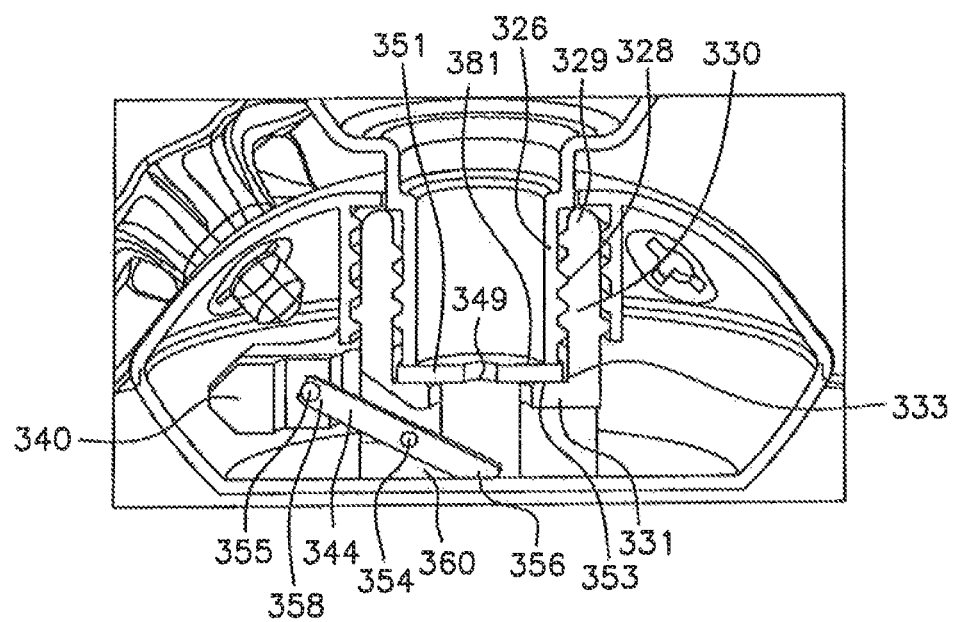
FIG. 13 is an enlarged sectional side view of the feeding basin, sealing plate and bottleneck extension of the feeder shown in FIG. 11, without the plug to show the hole in the plate.
Figure 14:
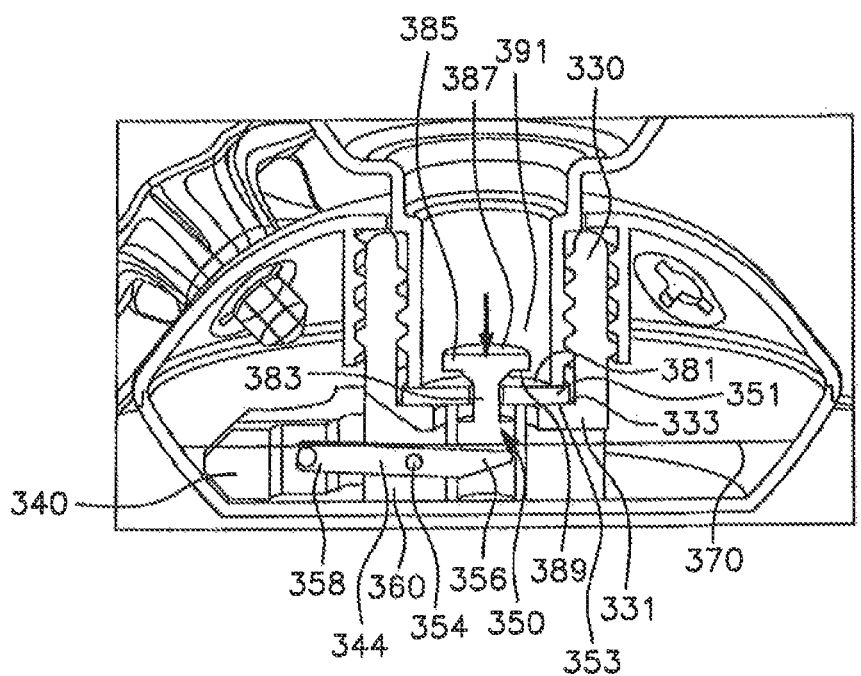
FIG. 14 is an enlarged sectional side view of the feeding basin, sealing mechanism and lower end of the liquid container of the feeder shown in FIG. 11, depicted in the open position.

As the float 240 rises with the fluid level 270, the lever 244 pivots on pin 254 to allow the plug 250 to move downwardly to the lower position shown in FIG. 10. In the lower position, the plug comes into sealing engagement with the side surface 266 of the well base 260, closing the fluid flow channel 280 and forming a seal so as to prevent additional nectar from entering the feeding basin 214. Fluid pressure in the container also helps to keep the seal closed.

A float valve style hummingbird feeder in accordance with a fourth embodiment of the present invention is shown in FIGS. 11-15 and is generally designated by reference numeral 300. The feeder consists of a reservoir bottle or liquid container generally designated by reference numeral 312, a feeding basin generally designated by reference numeral 314, and a sealing mechanism generally designated by reference numeral 316. The liquid container has a large opening at its upper end that is closed by a removable cap in the same manner as in the second and third embodiments and with corresponding reference numerals, and therefore a discussion thereof will not be repeated here.

The bottom of the liquid container 312 forms a generally cylindrical bottleneck-shaped extension 326 with external threads 328 so that it can be screw-threaded into the mating threads of a cylindrical wall 329 of an upwardly extending cylindrical well 330 of the feeding basin 314, shown in FIG. 11A. The well includes an inner flange having a generally flat upper surface 333 that supports the sealing mechanism. The bottleneck extension 326 fits within the well 330 and has an open lower end 332 configured to engage with and be sealed by the sealing or valve mechanism 316.

The sealing or valve mechanism 316 includes a float 340 connected by a lever 344 to a seal assembly, generally designated by reference numeral 342. The seal assembly 342 includes a sealing plate 351 with a hole 349 therein and a plug generally designated by reference numeral 350 movably mounted in the hole. The lower surface 353 of the sealing plate 351 is in sealing abutment with the upper surface 333 of the well flange 331 so that, when the bottle is screwed into the well, the lower end 332 of the bottleneck comes into sealing engagement with the upper surface 381 of the sealing plate 351 and fluid can only escape from the bottle through the hole 349 in the plate 351.

The plug 350 includes a post 383 that extends through the hole 349 and an enlarged head 385 on the upper end of the post 383 above the sealing plate 351. The outer diameter of the post 383 is smaller than the inner diameter of the hole 349, while the outer diameter of the head is larger than the hole diameter so as to completely cover the upper mouth of the hole. The plug functions as a valve to close the hole 349. Specifically, gravity and water pressure 391 act on the upper surface 387 of the head 385 to push the plug 350 downwardly and bring the lower surface 389 of the head into sealing abutment with the upper surface 381 of the sealing plate 351. When the plug is in this lower position, as shown in FIG. 15, fluid cannot flow through the hole 349.

The lever 344 is pivotally mounted at a central part thereof to a base 360 of the well 330 by a pivot pin 354. A first end 356 of the lever 344 is received through a port 345 in the side of the base 360 and extends under the plug 350. A second end 358 of the lever 344 is coupled to the float 340 by a pivot pin 355.

The plug 350 is vertically movable within the hole 349 between an upper position (shown in FIG. 14) and a lower position (shown in FIGS. 12 and 15) in response to vertical movement of the first end 356 of the lever 344. Vertical movement of the lever first end 356 is initiated by the position of the float 340 which, in turn, is determined by the fluid level 370 in the feeding basin 314 (see FIGS. 14 and 15). When the fluid level is low, as in FIG. 14, the float 340 is also in a low position. The weight of the float 340 acts on the lever 344, which pushes the plug 350 upwardly against the fluid pressure in the container 312. In this upper position, the plug 350 is pushed up such that the lower surface 389 of the head 385 is spaced above the upper surface 381 of the sealing plate 351. This spacing exposes the hole and, since the outer diameter of the post 383 is smaller than the inner diameter of the hole 349, fluid is enabled to flow around the post and through the hole 349 to fill the basin 314. As is evident, the weight of the float must be greater than the weight of the plug and the fluid pressure in the container 312.

Figure 15:
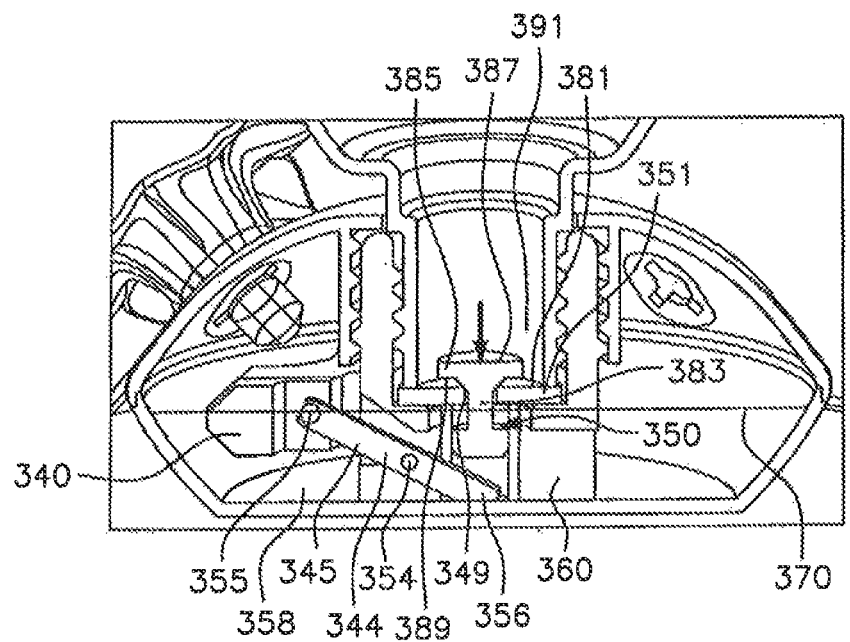
FIG. 15 is an enlarged sectional side view of the feeding basin, sealing mechanism and lower end of the liquid container of the feeder shown in FIG. 11, depicted in the closed position.

As the float 340 rises with the fluid level 370, the lever 344 pivots on pin 354 to allow the plug 350, in response to gravity and fluid pressure in the container, to move downwardly to the lower position shown in FIGS. 12 and 15. In the lower position, the lower surface 389 of the head 385 comes into sealing engagement with the upper surface 381 of the sealing plate 351, closing the hole 349 and forming a seal so as to prevent additional nectar from entering the feeding basin 314. As is evident, the float must have a buoyancy greater than its weight.

In all four of the embodiments described herein, a float valve is used to control the amount of liquid nectar allowed to enter the feeding basin of the top-fill hummingbird feeder. By venting the cover or cap 50 of the container holding the liquid nectar in each embodiment, atmospheric pressure can be used to dispense the nectar when the float valve is open. When the feeding basin is full, the float in conjunction with the nectar level automatically prevents further filling of the feeding basin. As such, overflow of the basin in response to temperature-related expansion of the air in the container from night to day time periods is also prevented.

Figure 16:
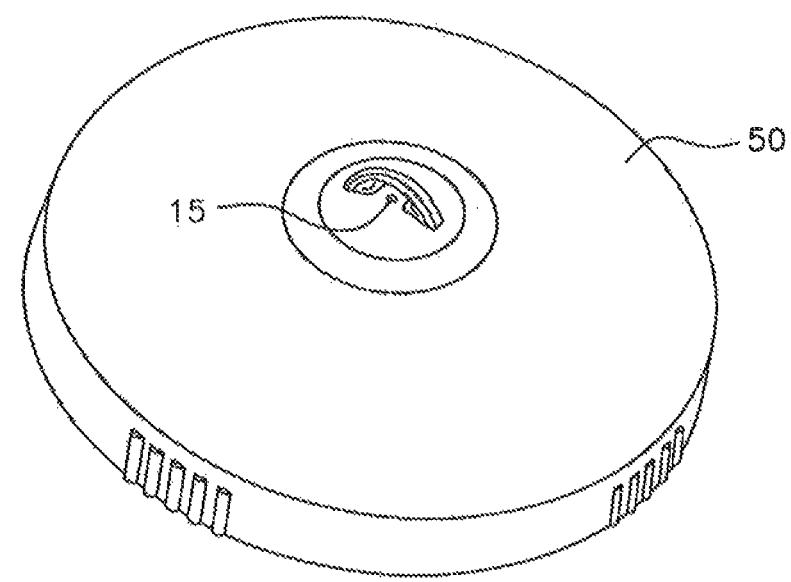
FIG. 16 is a perspective view of the container cap, as in FIG. 1, with a vent hole formed therein.

A representative location of a vent 15 in the cap 50 is shown in FIG. 16. While the vent can be located anywhere in the cap, the location of the vent 15 under the support feature 11 used to hang the feeder, as shown in FIG. 16, is advantageous as the support feature 11 helps to minimize the entry of water and debris into the feeder which could potentially contaminate the nectar inside. A simple filter or screen could also be added to minimize entry of foreign matter such as dirt or insects through the vent hole. In an alternative vent style, grooves or cuts may be formed in the cap threads to allow venting through the cap threads so that a vent hole is not necessary.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A top-fill hummingbird feeder comprising:
   a liquid container with an opening at a lower end and a removable cap at an upper end;
   a feeding basin positioned below the liquid container;
   an upwardly extending generally cylindrical well positioned in said feeding basin with an outer wall defining an interior that receives the lower end of said liquid container; and
   a float valve having a float and a sealing mechanism, said sealing mechanism including a sealing plate positioned generally horizontally adjacent said container lower end and having a hole therein to provide a liquid flow opening through said sealing plate, said float being movable up and down with respect to said well such that, when the float valve is in a first position, said liquid flow opening is open allowing fluid to flow from said container into said basin and, when the float valve is in a second position, said liquid flow opening is closed to prevent fluid flow from said container into said basin, a first part of said float valve extending into the interior of the well and a second part of said float valve positioned outside of and adjacent said well outer wall.

2. The top-fill hummingbird feeder as set forth in claim 1, wherein said sealing mechanism further includes a sealing member coupled to said float and movable upwardly and downwardly in response to changing fluid level, in said feeding basin.

3. The top-fill hummingbird feeder as set forth in claim 2, wherein said sealing member is positioned below said sealing plate and is vertically movable between an upper position and a lower position relative to said sealing plate.

4. The top-fill hummingbird feeder as set forth in claim 2, wherein said sealing member is positioned on an upper surface of said float.

5. The top fill hummingbird feeder as set forth in claim 1, wherein said feeder is vented to subject liquid in said liquid container to atmospheric pressure during use of said feeder.

6. A top-fill hummingbird feeder comprising:
   a liquid container with a liquid flow opening at a lower end and a removable cap at an upper end through which said liquid container is filled with liquid nectar;
   a feeding basin positioned below the liquid flow opening of said liquid container to receive said liquid nectar passing through said liquid flow opening; and
   a sealing assembly associated with the liquid container and the feeding basin, said sealing assembly including an upwardly extending generally cylindrical well in said feeding basin that receives the lower end of said liquid container and a float valve including a float and a seal member operative within said well to open and close said liquid flow opening by moving vertically between two positions, said float moving upwardly and downwardly in response to changing fluid level in said feeding basin, said float controlling at least one direction of movement of said seal member, said sealing assembly including a sealing plate positioned horizontally adjacent said container lower end and having a hole therein to provide a liquid opening through said sealing plate.

7. The top-fill hummingbird feeder as set forth in claim 6, wherein said seal member is positioned below said sealing plate and is vertically movable between an upper position and a lower position relative to said sealing plate.

8. The top-fill hummingbird feeder as set forth in claim 6, wherein said seal member is positioned on an upper surface of said float and cooperates with said sealing plate positioned adjacent said liquid container lower end to control flow of nectar from said container into said feeding basin.

9. A top-fill hummingbird feeder comprising:
   a liquid container with a liquid flow opening at a lower end and a removable can at an upper end through which said liquid container is filled with liquid nectar;
   a feeding basin positioned below the liquid flow opening of said liquid container to receive said liquid nectar passing through said liquid flow opening;
   an upwardly extending generally cylindrical well positioned in said feeding basin that receives the lower end of said liquid container; and
   a float valve including a float, and a sealing member guided in a generally vertical direction by said well to open and close said liquid flow opening by moving upwardly and downwardly in response to changing fluid level in said feeding basin, said float controlling at least one direction of movement of said sealing member, said well minimizing horizontal movement of said float within said feeding basin, said sealing member being operative with a sealing plate that is positioned generally horizontally adjacent said container lower end, said sealing plate having a hole therein to provide a liquid flow opening through said sealing plate.

10. The top-fill hummingbird feeder as set forth in claim 9, wherein said sealing member is positioned below said plate and is vertically movable between an upper position and a lower position relative to said plate.

11. The top fill hummingbird feeder as set forth in claim 9, wherein said sealing member is positioned on an upper surface of said float.

* * * * *